US012196383B2

(12) United States Patent
Jun

(10) Patent No.: US 12,196,383 B2
(45) Date of Patent: Jan. 14, 2025

(54) LAMP FOR VEHICLE AND VEHICLE INCLUDING THE SAME

(71) Applicant: HYUNDAI MOBIS CO., LTD., Seoul (KR)

(72) Inventor: Young Geun Jun, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/485,542

(22) Filed: Oct. 12, 2023

(65) Prior Publication Data

US 2024/0151375 A1 May 9, 2024

(30) Foreign Application Priority Data

Nov. 8, 2022 (KR) ........................ 10-2022-0148213

(51) Int. Cl.
*F21S 41/255* (2018.01)
*F21S 41/143* (2018.01)

(52) U.S. Cl.
CPC ........... *F21S 41/255* (2018.01); *F21S 41/143* (2018.01)

(58) Field of Classification Search
CPC ..... G02B 27/0911; F21S 41/25; F21S 41/255; F21S 41/275
See application file for complete search history.

(56) References Cited

U.S. PATENT DOCUMENTS

| | | | | |
|---|---|---|---|---|
| 11,313,528 B2 * | 4/2022 | Kim | G02B 27/0025 |
| 2016/0061399 A1 * | 3/2016 | Lee | F21S 41/285<br>362/522 |
| 2019/0203897 A1 * | 7/2019 | Kim | F21S 41/25 |

* cited by examiner

*Primary Examiner* — Karabi Guharay
(74) *Attorney, Agent, or Firm* — NSIP Law

(57) ABSTRACT

A lamp for vehicle, and a vehicle including the same, including a lamp apparatus including a light source part including a plurality of light sources for radiating light forward and a lens part configured to receive the light radiated from the light source part, a vertical focus position of the lens part and a horizontal focus position of the lens part are different from each other, the vertical focus position of the lens part is observed along an up and down direction of the lens part, where the horizontal focus position is observed along a left and right direction of the lens part.

17 Claims, 8 Drawing Sheets

LAMP FOR VEHICLE AND VEHICLE INCLUDING THE SAME

CROSS-REFERENCE TO RELATED APPLICATION

This application claims the benefit under 35 USC 119(a) of priority to Korean Patent Application No. 10-2022-0148213, filed in the Korean Intellectual Property Office on Nov. 8, 2022, the entire disclosure of which is incorporated herein by reference for all purposes.

BACKGROUND

1. Field

The present disclosure relates to a lamp for vehicle and a vehicle including the same.

2. Description of the Related Art

A matrix headlamp technology is a technology for inter-working with a camera sensor included in a host vehicle and partially turning on a high beam although there is an oncoming vehicle or a preceding vehicle in front of the host vehicle to expand visibility. To this end, matrix headlamps include a plurality of light-emitting diodes (LEDs) and separately control ON and OFF of the plurality of LEDs.

An optical system applied to such a matrix headlamp technology is composed of an LED, primary optics, and a secondary lens. The primary optics may serve as a collimator which collects light from a light source to a focal point of the secondary lens. An aspheric lens having one focal point is mainly used as the secondary lens in the matrix headlamp technology.

For such a matrix headlamp technology, there is a need for various types of primary optics such that light is collected at a location near the focal point of the secondary lens and is incident to the secondary lens, a bracket for fixing the primary optics, and the like. These are the factors that contribute to the rise in cost.

Furthermore, as the matrix headlamp technology is mainly applied to a high beam technology, because the primary optics should be designed such that the shape of the radiation area may be biased upward, the shape of the primary optics becomes complicated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a lamp apparatus including a light source part including a plurality of light sources for radiating light forward and a lens part configured to receive the light radiated from the light source part, a vertical focus position of the lens part and a horizontal focus position of the lens part are different from each other, the vertical focus position of the lens part is observed along an up and down direction of the lens part, where the horizontal focus position is observed along a left and right direction of the lens part.

The lens part may include a first portion observed along the up and down direction and a second portion observed along the left and right direction, and the first portion differs in curvature from the second portion.

The lens part may include an upper area and a lower area located at a lower side of the upper area, where a first vertical focus position and a second vertical focus position are different from each other, the first vertical focus position being observed at the upper area along the up and down direction and the second vertical focus position being observed at the lower area along the up and down direction.

A first length in the up and down direction of an upper radiation area is longer than a second length in the up and down direction of a lower radiation area and a first radiation area includes the upper radiation area having an upper portion of the light radiated from the light source passing therethrough and the lower radiation area having a lower portion of the light radiated from the light source passing therethrough.

A first portion of the upper area observed from the upper area along the up and down direction and a second portion of the upper area observed from the upper area along the left and right direction may differ in curvature from each other and a first portion of the lower area observed from the lower area along the up and down direction and a second portion of the lower area observed from the lower area along the left and right direction may differ in curvature from each other.

A first horizontal focus position and a second horizontal focus position may correspond to each other, the first horizontal focus position being observed from the upper area along the left and right direction, and the second horizontal focus position being observed from the lower area along the left and right direction.

A third length in the left and right direction of an upper radiation area may correspond to a fourth length in the left and right direction of a lower radiation area, and a second radiation area includes the upper area having an upper portion of the light source passing therethrough, and the lower area having a lower portion of the light source pass therethrough.

A step difference may be formed between the upper area and the lower area with respect to a boundary area defining a boundary between the upper area and the lower area on an exit plane of the lens part.

The apparatus may include an optic part configured to protrude to an outer side on the exit plane of the lens part, the optic part including a boundary optic part formed along the boundary area.

A separation distance between the plurality of light sources may be less than or equal to 1 mm.

A distance at which the light source part and an incident plane of the lens part are spaced apart from each other may be less than or equal to 25 mm along a front and rear direction.

In a general aspect here is provided a vehicle including a lamp, the lamp including a light source part having a plurality of light sources for radiating light and a lens part configured to receive the light radiated from the light source part, the lens part including an upper area and a lower area located at a lower side of the upper area, and a first size of an upper radiation area is different from a second size of a lower radiation area, the upper radiation area includes a portion of the upper area having an upper portion of the light passing therethrough, and the lower radiation area includes a portion of the lower area having a lower portion of the light passing therethrough.

In a general aspect, here is provided a lens including a lens part configured to receive light from a light source, a vertical focus position of the lens part is observed along an up and down direction of the lens part, a horizontal focus position being observed along a left and right direction of the lens part, and the vertical focus position being different from the horizontal focus position.

The lens part may include a first portion observed along the up and down direction having a first curvature and a second portion of observed along the left and right direction having a second curvature, and the first curvature may differ from the second curvature.

The lens part may include an upper area including a first vertical focus position observed at the upper area along the up and down direction and a lower area located at a lower side of the upper area, the lower area including a second vertical focus position observed at the lower area along the up and down direction, and the first vertical focus position and the second vertical focus position may be different from each other.

A first curvature of a first portion of the upper area observed from the upper area along the up and down direction differs from a second curvature of a second portion of the upper area observed from the upper area along the left and right direction A third curvature of a first portion of the lower area observed from the lower area along the up and down direction differs from a fourth curvature of a second portion of the lower area observed from the lower area along the left and right direction.

Figure 1:
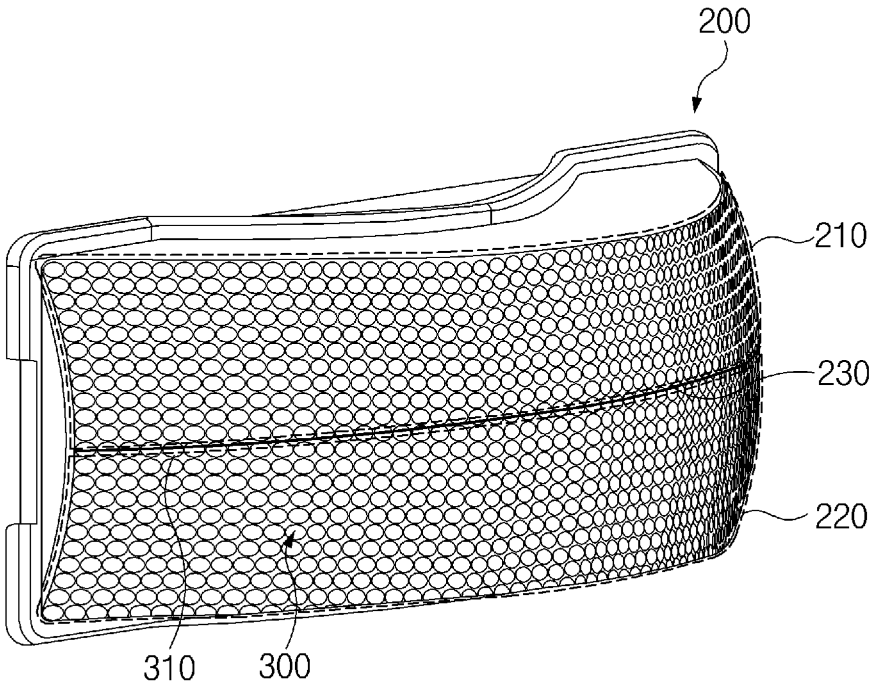
FIG. 1 is a drawing illustrating a lens part of a lamp for vehicle according to an embodiment of the present disclosure.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the teams used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is famed at an upper side or a lower side with respect to another element.

The singular forms "a", "an", and "the" are intended to include the plural foams as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

A lamp according to an embodiment of the present disclosure relates to a lamp available in a vehicle. As an example, the lamp for vehicle may be a headlamp. As an example, the lamp for vehicle may be a lamp for radiating a high beam. However, an embodiment of the present disclosure is not limited thereto. It is obvious that the lamp according to an embodiment of the present disclosure is applicable to lamps in various fields, for example, a rear lamp.

In the specification, a front and rear direction, a left and right direction, and an up and down direction are called for convenience of description, which are directions orthogonal to each other. However, such directions are relatively determined to a direction where lamps are arranged. The up and down direction may not necessarily refer to a vertical direction.

Figure 2:
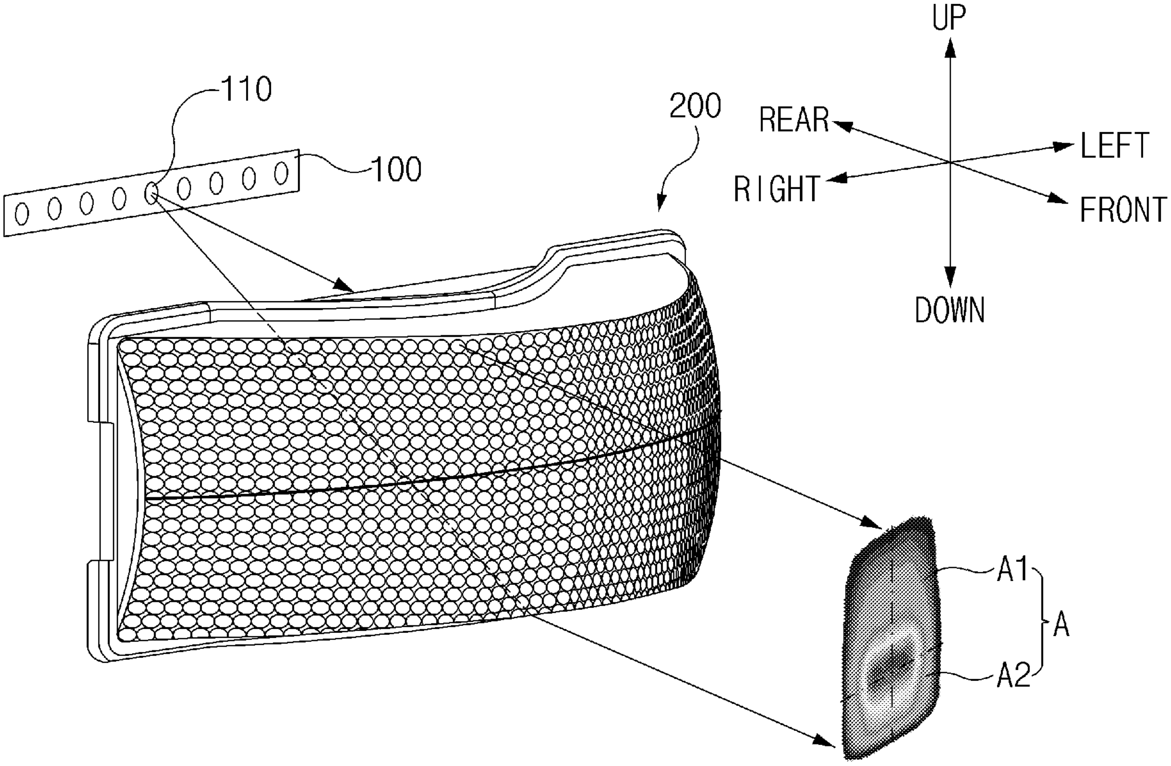
FIG. 2 is a drawing conceptually illustrating a radiation area by a light source part and one light source in FIG. 1.
Figure 3:
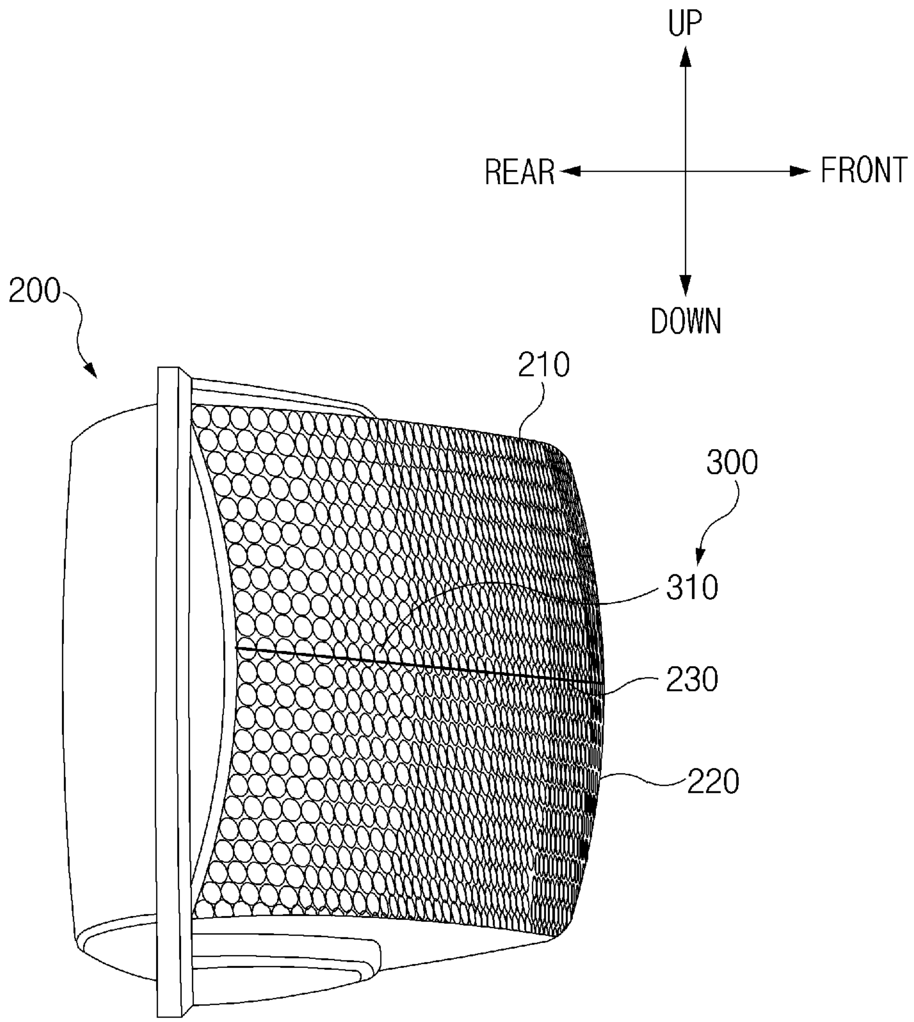
FIG. 3 is a side view of a lens part of a lamp for vehicle according to an embodiment of the present disclosure.

FIG. 1 is a drawing illustrating a lens part of a lamp for vehicle according to an embodiment of the present disclosure. FIG. 2 is a drawing conceptually illustrating a radiation area by a light source part and one light source in FIG. 1. FIG. 3 is a side view of a lens part of a lamp for vehicle according to an embodiment of the present disclosure.

The lamp for vehicle may include a light source part 100 and a lens part 200. The light source part 100 may include a plurality of light sources 110 for radiating light forward. As an example, the light sources 110 may be light-emitting diodes (LEDs). As an example, a separation distance between the plurality of light sources 110 may be formed less than or equal to 1 mm. The light sources 110 may be arranged in one row along a left and right direction, but it is possible for the light sources 110 to be formed in two or more rows.

The lens part 200 may be a component to which light radiated from the light source part 100 is incident. As an example, the lens part 200 may be an anamorphic lens. The lens part 200 may have an incident plane to which light is incident and an exit plane from which light exits. The exit plane may be located at a front side of the incident plane.

Figure 4:
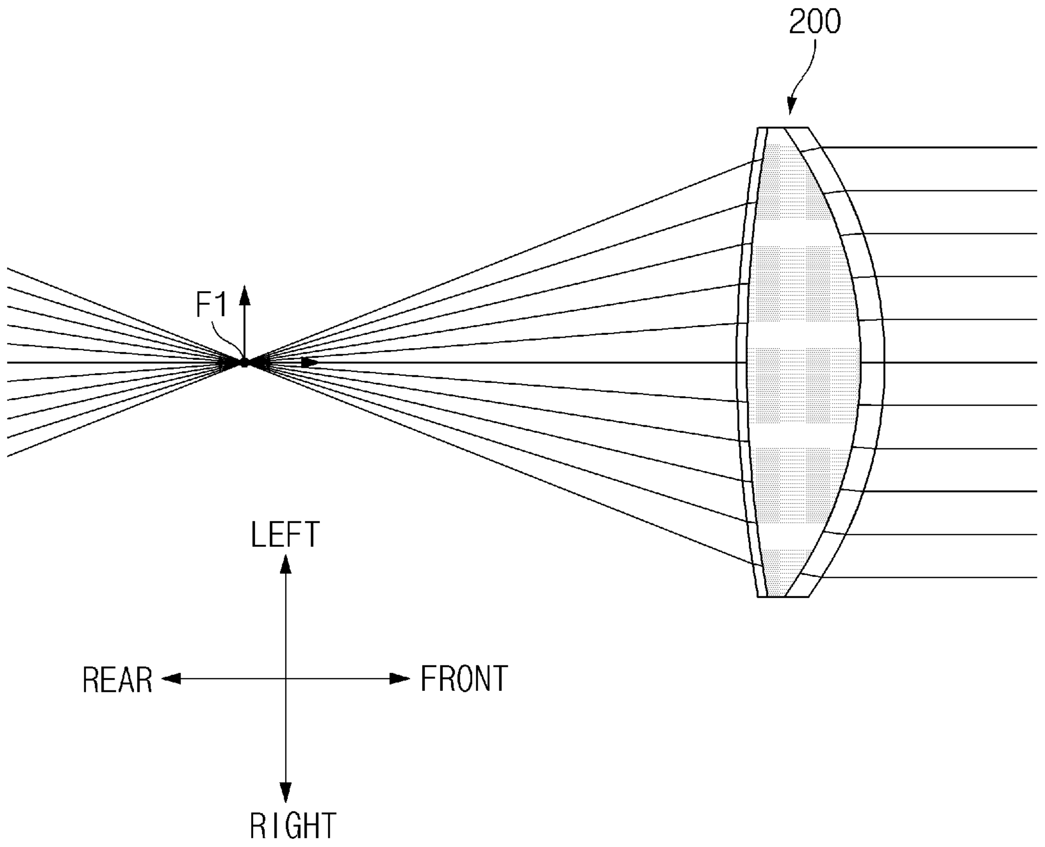
FIG. 4 is a drawing illustrating a vertical focus position.
Figure 5:
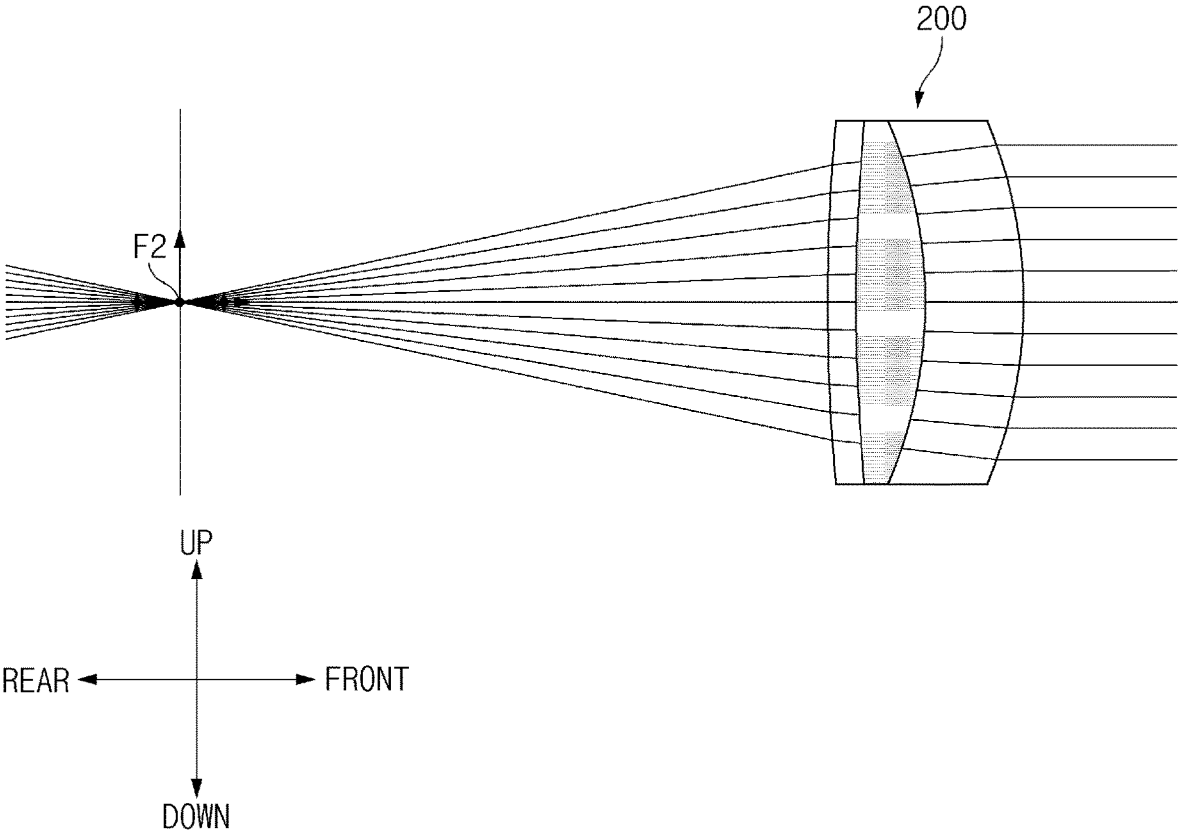
FIG. 5 is a drawing illustrating a horizontal focus position.

Hereinafter, the focus position of the lens part 200 will be referred to as a vertical focus position F1 when looking at the lens part 200 along an up and down direction and the focus position of the lens part 200 will be referred to as a horizontal focus position F2 when looking at the lens part 200 along a left and right direction. The vertical focus position F1 and the horizontal focus position F2 of the lens part 200 may be different from each other. FIG. 4 is a drawing illustrating a vertical focus position. FIG. 5 is a drawing illustrating a horizontal focus position. As shown in FIGS. 4 and 5, a distance at which a vertical focus position F1 is spaced apart from a lens part 200 in FIG. 4 and a distance at which a horizontal focus position F2 is spaced apart from the lens part 200 in FIG. 5 may be different from each other.

According to an embodiment of the present disclosure, as an anamorphic lens rather than an aspheric lens is applied to the lamp for vehicle, because it is able to remove a primary optic part required when using the aspheric lens, a structure may be simplified and costs may be reduced.

According to an embodiment of the present disclosure, because the primary optic part is removed, a distance at which a light source part 100 and an incident plane of the lens part 200 are spaced apart from each other along a front and rear direction may be formed less than or equal to 25 mm. As the distance at which the light source part 100 and the incident plane of the lens part 200 are spaced apart from each other is formed less than or equal to 25 mm, because volume occupied by the lamp for vehicle in the vehicle becomes small, a degree of use of a vehicle space may increase and costs may be reduced.

Meanwhile, when considering characteristics of a high beam, in the lamp for vehicle according to an embodiment of the present disclosure, a radiation area formed as light passes through the lens part 200 should be formed to be long upwardly. Hereinafter, a description will be given in detail of a detailed shape of the lens part 200 having a shape suitable for radiation of the high beam.

The lens part 200 may include an upper area 210 and a lower area 220. The lower area 220 may be formed at a lower side of the upper area 210. The focus position of the upper area 210 will be referred to as a first vertical focus position when looking at the upper area 210 along an up and down direction, and the focus position of the lower area 220 will be referred to as a second vertical focus position when looking at the lower area 220 along the up and down direction. In an embodiment of the present disclosure, the first vertical focus position and the second vertical focus position may be different from each other.

A radiation area formed as the light radiated from light sources 110 passes through the upper area 210 will be referred to as an upper radiation area A1, and a radiation area formed as the light radiated from the light sources 110 passes through the lower area 220 will be referred to as a lower radiation area A2. That the first vertical focus position and the second vertical focus position are different from each other may mean that a length in the up and down direction of the upper radiation area A1 is different from a length in the up and down direction of the lower radiation area A2.

As an example, as shown in FIG. 2, the length in the up and down direction of the upper radiation area A1 may be famed to be longer than the length in the up and down direction of the lower radiation area A2.

Meanwhile, when the focus position of the upper area 210 is a first horizontal focus position when looking at the upper area 210 along the left and right direction and when the focus position of the lower area 220 is a second horizontal focus position when looking at the lower area 220 along the left and right direction, the first horizontal focus position and the second horizontal focus position may correspond to each other. This may mean that a length in the left and right direction of the upper radiation area A1 corresponds to a length in the left and right direction of the lower radiation area A2. As a result, the radiation area may overall have a shape similar to a rectangle.

As described above, because the light source part 100 has the plurality of light sources 110, the radiation area where the light source part 100 is famed may have a shape where several rectangles are arranged. The lamp for vehicle according to an embodiment of the present disclosure may interwork with a camera sensor included in a host vehicle to partially turn on only some of the plurality of light sources 110 when there is an oncoming vehicle or a preceding vehicle in front of the host vehicle, thus preventing dazzle from being generating in the oncoming or the preceding vehicle.

Meanwhile, due to characteristics of an anamorphic lens, the lens part 200 when looking at the lens part 200 along the up and down direction and the lens part 200 when looking at the lens part 200 along the left and right direction may differ in curvature from each other. Likewise, the upper area 210 when looking at the upper area 210 along the up and down direction and the upper area 210 when looking at the upper area 210 along the left and right direction may differ in curvature from each other. Furthermore, the lower area 220 when looking at the lower area 220 along the up and down direction and the lower area 220 when looking at the lower area 220 along the left and right direction may differ in curvature from each other.

Because the upper area 210 and the lower area 220 differ in curvature from each other, a step difference between the upper area 210 and the lower area 220 may be formed. In detail, the step difference between the upper area 210 and the lower area 220 may be famed with respect to a boundary area 230 defining a boundary between the upper area 210 and the lower area 220 on an exit plane of the lens part 200.

As the step difference is formed between the upper area 210 and the lower area 220, there may be concern that the uniformity of a beam pattern will be relatively reduced. To this end, the lamp for vehicle according to an embodiment of the present disclosure may have a boundary optic part 310.

In detail, the lamp for vehicle according detail embodiment of the present disclosure may include an optic part 300. The optic part 300 may be formed to protrude to an outer side on the exit plane of the lens part 200. The optic part 300 may be formed in various shapes such as a hemispherical shape, a cylindrical shape, and a square pillar shape, and a pitch and a protrusion length thereof may be adjusted by user's needs.

Figure 6:
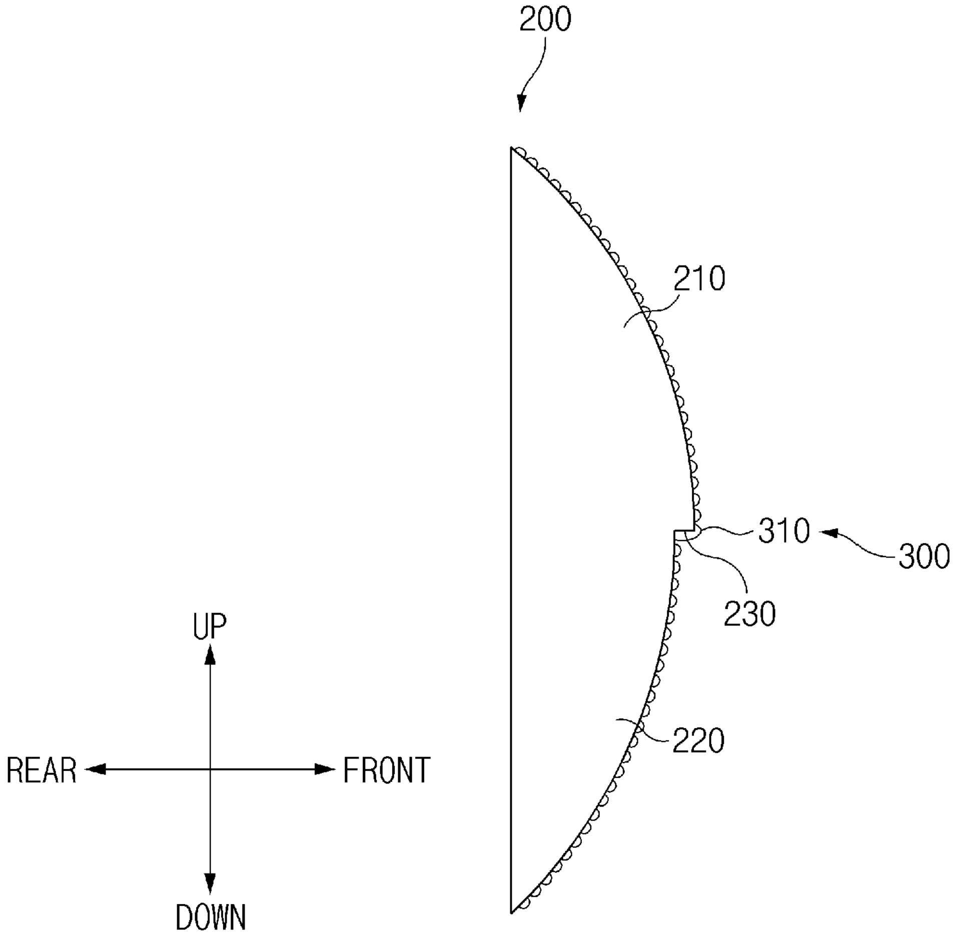
FIG. 6 is a drawing conceptually illustrating a cross-sectional view of a lens part of a lamp for vehicle according to an embodiment of the present disclosure.

FIG. 6 is a drawing conceptually illustrating a cross-sectional view of a lens part of a lamp for vehicle according to an embodiment of the present disclosure. A step difference between an upper area 210 and a lower area 220 is illustrated in an exaggerated manner for helping the understanding of the present disclosure in FIG. 6.

An optic part 300 may include a boundary optic part 310 formed along a boundary area 230. Because the boundary optic part 310 is formed to protrude along the boundary area 230, the step difference formed between the upper area 210 and the lower area 220 may be partially overcome through the boundary optic part 310.

Figure 7:
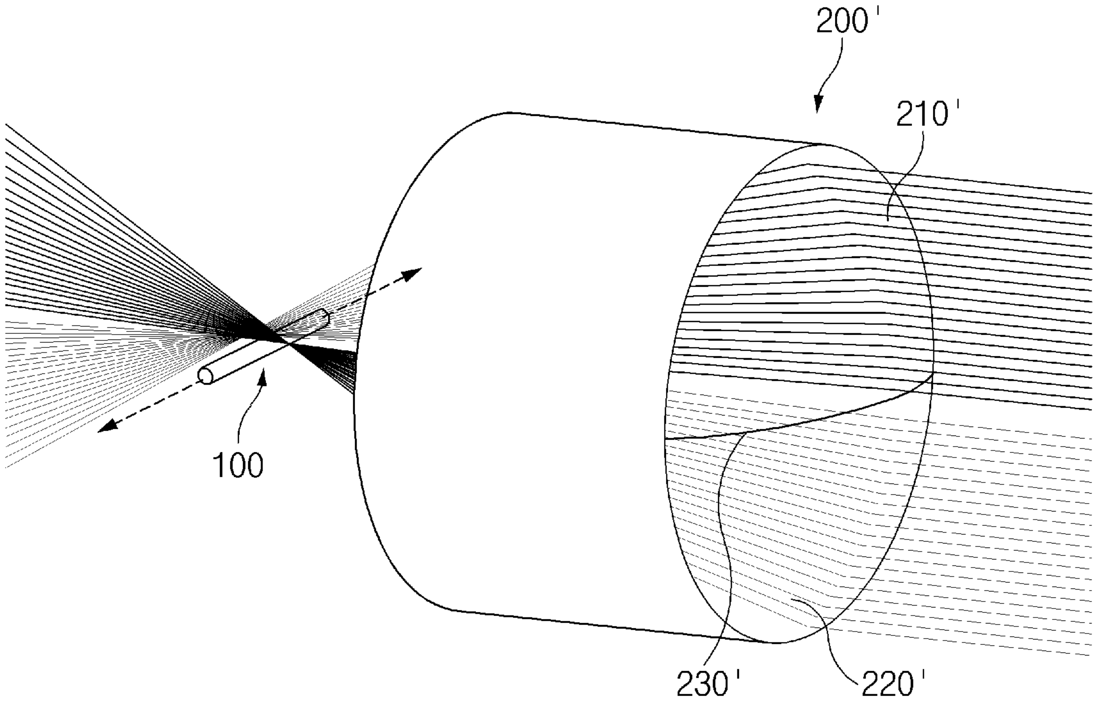
FIG. 7 is a drawing illustrating another example of a lens part.
Figure 8:
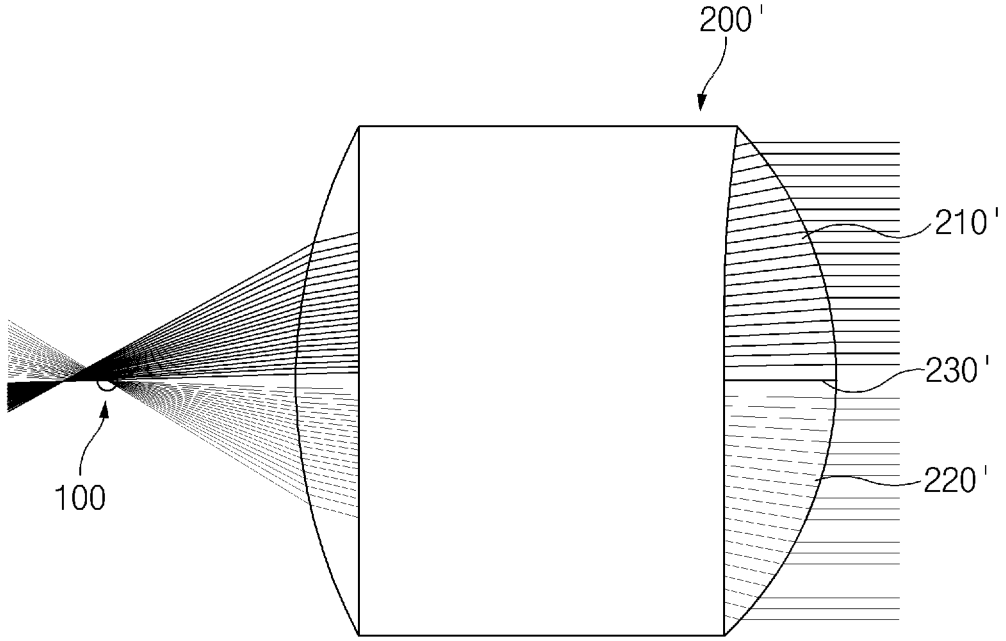
FIG. 8 is a diagram illustrating an appearance of a lens part of FIG. 7 viewed from the right.

FIG. 7 is a drawing illustrating another example of a lens part. FIG. 8 is a diagram illustrating an appearance of a lens part of FIG. 7 viewed from the right. As shown in FIGS. 7 and 8, as an upper area 210' and a lower area 220' differ in curvature from each other, the lens part 200' may be variously formed in shape within a range where a step difference is able to be formed in a boundary area 230'. For reference, an optic part is omitted and illustrated in FIGS. 7 and 8, but it may be possible for the optic part to be formed in a lens part.

According to an embodiment of the present disclosure, as the lamp for vehicle does not use primary optics for forming a beam pattern in, using an anamorphic lens where an upper area and a lower area differ in curvature from each other, a production cost may be reduced, a structure may be simplified, and an occupied space may become small. Thus, space efficiency may increase when the lamp for vehicle is applied to the vehicle.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lamp apparatus, the apparatus comprising:

a light source part comprising a plurality of light sources for radiating light forward; and a lens part configured to receive the light radiated from the light source part, wherein a vertical focus position of the lens part and a horizontal focus position of the lens part are different from each other, wherein the vertical focus position of the lens part is observed along an up and down direction of the lens part, wherein the horizontal focus position is observed along a left and right direction of the lens part, and wherein a first length in the up and down direction of an upper radiation area is longer than a second length in the up and down direction of a lower radiation area.

2. The apparatus of claim 1, wherein the lens part comprises a first portion observed along the up and down direction and a second portion observed along the left and right direction, and wherein the first portion differs in curvature from the second portion.

3. The apparatus of claim 2, wherein the lens part comprises:

an upper area; and a lower area located at a lower side of the upper area, and wherein a first vertical focus position and a second vertical focus position are different from each other, wherein the first vertical focus position is observed at the upper area along the up and down direction, and wherein the second vertical focus position is observed at the lower area along the up and down direction.

4. The apparatus of claim 3, wherein a first radiation area includes:

the upper radiation area having an upper portion of the light radiated from the light source passing therethrough; and the lower radiation area having a lower portion of the light radiated from the light source passing therethrough.

5. The apparatus of claim 3, wherein a first portion of the upper area observed from the upper area along the up and down direction and a second portion of the upper area observed from the upper area along the left and right direction differ in curvature from each other, and wherein a first portion of the lower area observed from the lower area along the up and down direction and a second portion of the lower area observed from the lower area along the left and right direction differ in curvature from each other.

6. The apparatus of claim 3, wherein a first horizontal focus position and a second horizontal focus position correspond to each other, wherein the first horizontal focus position is observed from the upper area along the left and right direction, and wherein the second horizontal focus position is observed from the lower area along the left and right direction.

7. The apparatus of claim 6, wherein a third length in the left and right direction of an upper radiation area corresponds to a fourth length in the left and right direction of a lower radiation area, wherein when a second radiation area includes:

the upper area having an upper portion of the light source passing therethrough, and the lower area having a lower portion of the light source pass therethrough.

8. The apparatus of claim 3, wherein a step difference is formed between the upper area and the lower area with respect to a boundary area defining a boundary between the upper area and the lower area on an exit plane of the lens part.

9. The apparatus of claim 8, further comprising:

an optic part configured to protrude to an outer side on the exit plane of the lens part, wherein the optic part comprises a boundary optic part formed along the boundary area.

10. The apparatus of claim 1, wherein a separation distance between the plurality of light sources is less than or equal to 1 mm.

11. The apparatus of claim 1, wherein a distance at which the light source part and an incident plane of the lens part are spaced apart from each other is less than or equal to 25 mm along a front and rear direction.

12. A vehicle, the vehicle comprising:

a lamp, wherein the lamp comprises:

a light source part comprising a plurality of light sources for radiating light; and a lens part configured to receive the light radiated from the light source part, wherein the lens part comprises:

an upper area; and a lower area located at a lower side of the upper area, wherein a first size of an upper radiation area is different from a second size of a lower radiation area, wherein the upper radiation area includes a portion of the upper area having an upper portion of the light passing therethrough, wherein the lower radiation area includes a portion of the lower area having a lower portion of the light passing therethrough, and wherein a first length in the up and down direction of an upper radiation area is longer than a second length in the up and down direction of a lower radiation area.

13. A lens, the lens comprising:

a lens part configured to receive light from a light source, wherein a vertical focus position of the lens part is observed along an up and down direction of the lens part, wherein a horizontal focus position is observed along a left and right direction of the lens part, and wherein the vertical focus position is different from the horizontal focus position, and wherein a first length in the up and down direction of an upper radiation area is longer than a second length in the up and down direction of a lower radiation area.

14. The lens of claim 13, wherein the lens part comprises a first portion observed along the up and down direction having a first curvature and a second portion of observed along the left and right direction having a second curvature, and wherein the first curvature differs from the second curvature.

15. The lens of claim 13, wherein the lens part comprises:

an upper area including a first vertical focus position observed at the upper area along the up and down direction; and a lower area located at a lower side of the upper area, the lower area including a second vertical focus position observed at the lower area along the up and down direction, and wherein the first vertical focus position and the second vertical focus position are different from each other.

16. The lens of claim 15, wherein a first curvature of a first portion of the upper area observed from the upper area along the up and down direction differs from a second curvature of a second portion of the upper area observed from the upper area along the left and right direction.

17. The lens of claim 15, wherein a third curvature of a first portion of the lower area observed from the lower area along the up and down direction differs from a fourth curvature of a second portion of the lower area observed from the lower area along the left and right direction.

* * * * *